(12) United States Patent
Sato

(10) Patent No.: US 9,341,699 B2
(45) Date of Patent: May 17, 2016

(54) METHOD OF CONTROLLING MOBILE INFORMATION TERMINAL AND MOBILE INFORMATION TERMINAL

(71) Applicant: FUJITSU LIMITED, Kawasaki-shi, Kanagawa (JP)

(72) Inventor: Takuya Sato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 136 days.

(21) Appl. No.: 14/138,566

(22) Filed: Dec. 23, 2013

(65) Prior Publication Data
US 2014/0287774 A1    Sep. 25, 2014

(30) Foreign Application Priority Data
Mar. 22, 2013    (JP) ................. 2013-059417

(51) Int. Cl.
*H04W 4/02*    (2009.01)
*G01S 5/02*    (2010.01)
*H04W 52/02*    (2009.01)
*H04M 1/725*    (2006.01)

(52) U.S. Cl.
CPC .......... *G01S 5/0221* (2013.01); *H04W 52/0254* (2013.01); *H04M 1/72569* (2013.01); *H04M 1/72572* (2013.01); *H04M 2250/06* (2013.01); *H04M 2250/10* (2013.01); *H04M 2250/12* (2013.01); *Y02B 60/50* (2013.01)

(58) Field of Classification Search
CPC ....... H04W 4/02; H04W 64/00; H04W 52/02; H04W 24/00; H04W 64/006
USPC ............ 340/990, 995.24, 988, 994; 342/457, 342/450, 357.31; 701/469, 517, 500; 455/456.1, 456.6, 556.1, 574
See application file for complete search history.

(56) References Cited

U.S. PATENT DOCUMENTS

| | | | |
|---|---|---|---|
| 6,124,810 A * | 9/2000 | Segal | G08G 1/20 340/441 |
| 6,456,936 B1 * | 9/2002 | Neukirchen et al. | 701/468 |
| 7,116,992 B1 | 10/2006 | Tsunehara et al. | |
| 2009/0165049 A1 * | 6/2009 | Sekiguchi | H04H 60/51 725/39 |
| 2010/0323754 A1 | 12/2010 | Nakagawa | |
| 2012/0136572 A1 * | 5/2012 | Norton | 701/465 |
| 2012/0295642 A1 * | 11/2012 | Takahashi et al. | 455/456.6 |

FOREIGN PATENT DOCUMENTS

| | | |
|---|---|---|
| JP | 3869724 | 1/2007 |
| JP | 2011-171920 | 9/2011 |
| WO | WO 2008/099736 A1 | 8/2008 |

* cited by examiner

*Primary Examiner* — Christopher M Brandt
(74) *Attorney, Agent, or Firm* — Oblon, McClelland, Maier & Neustadt, L.L.P

(57) ABSTRACT

A method of controlling a mobile information terminal including a positioning sensor includes creating a speed profile to a destination location based on a distance to the destination location, information on a speed of a mode of travel to the destination location, and information on stopping before the destination location, and calculating a crock time to cause the positioning sensor to perform positioning based on the speed profile.

14 Claims, 14 Drawing Sheets

FIG. 4

SENSOR INFORMATION TABLE T

| POSITIONING SENSOR | ERROR | AMOUNT OF POWER CONSUMPTION | POSITIONING TIME |
|---|---|---|---|
| GPS | 10m | 600mAs | 30s |
| Wi-Fi | 200m | 30mAs | 5s |
| Cell-ID | 5km | 1mAs | 1s |

METHOD OF CONTROLLING MOBILE INFORMATION TERMINAL AND MOBILE INFORMATION TERMINAL

CROSS-REFERENCE TO RELATED APPLICATION

This application is based upon and claims the benefit of priority of the prior Japanese Patent Application No. 2013-059417, filed on Mar. 22, 2013, the entire contents of which are incorporated herein by reference.

FIELD

The embodiments discussed herein are related to a method of controlling a mobile information terminal and a mobile information terminal.

BACKGROUND

In recent years, as positioning functions become popular in mobile information terminals, a so-called positional service to provide a service in accordance with a position of a mobile information terminal to a user is provided. For example, in order to avoid forgetting to get off the train, there is so-called location alarm to notify a user of getting close to a destination station. Such location alarm is used not only to avoid forgetting to get off the train but also to notify a user of getting close to a destination location (such as a dry cleaner's and a supermarket), for example, intended to stop by on the way home from work.

While the convenience of users is improved by such positional service, the increase in power consumption becomes a problem in location alarm because the positioning function of a mobile information terminal has to be operated continuously.

Therefore, various techniques to reduce power consumption are developed. For example, there is a disclosed technique to lower the power consumption by increasing the frequency of position calculation when the distance to a destination location is close and by decreasing the frequency of position calculation when the distance to a destination location is far.

An example of the related art is disclosed in Japanese Patent No.

SUMMARY

According to an aspect of the invention, a method of controlling a mobile information terminal including a positioning sensor includes creating a speed profile to a destination location based on a distance to the destination location, information on a speed of a mode of travel to the destination location, and information on stopping before the destination location, and calculating a crock time to cause the positioning sensor to perform positioning based on the speed profile.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a schematic view of a sensor information table according to the first embodiment;

DESCRIPTION OF EMBODIMENTS

In a case of controlling the frequency of position calculation based on the distance to a destination location, the effect of reducing the positioning frequency is large when the destination location is far, while the effect of reducing the positioning frequency becomes small as the destination location becomes closer, so that it is not possible to sufficiently lower the power consumption. However, when the positioning frequency is simply lowered to reduce the power consumption, the reliability of positional service may be lowered by passing through the destination location before the positioning clock time.

First Embodiment

Descriptions are given below to a first embodiment with reference to FIGS. 1 through 6B.

[Method of Delaying Positioning Clock Time]

Figure 1:
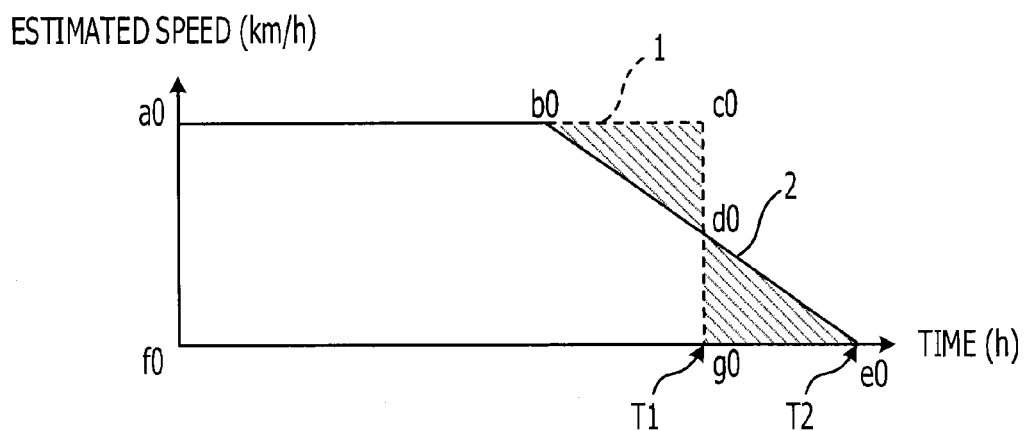
FIG. 1 is a graph of a travel speed model when a user of a mobile information terminal according to a first embodiment moves from a current location to a destination location.

FIG. 1 is a graph of a travel speed model when a user of a mobile information terminal 100 according to the first embodiment moves from a current location to a destination location. In the graph, the horizontal axis represents time [h] and the vertical axis represents an estimated value of a travel speed (estimated speed) [km/h].

A travel speed profile 1 (dotted line: $a_0 b_0 c_0 d_0 g_0$) is a travel speed model according to a related technique, and a travel speed profile 2 (solid line: $a_0 b_0 d_0 e_0$) is a travel speed model according to a novel technique.

Since both are travel speed models from a current location to a destination location, a distance from a current location to a destination location (hereinafter, referred to as a destination location distance) is calculated by time integration of the travel speed profiles 1 and 2. That is, an area of a rectangular region $a_0 b_0 c_0 d_0 g_0 f_0$ (time integration of the travel speed profile 1) and an area of a trapezoidal region $a_0 b_0 d_0 e_0 g_0 f_0$ (time integration of the travel speed profile 2) are equivalent. An area of a triangular region $b_0c_0d_0$ and an area of a triangular region $d_0e_0g_0$ are also equivalent.

As illustrated in FIG. 1, in the travel speed profile 1, estimated values of the travel speed are fixed from a current location to a destination location. However, a user of the mobile information terminal 100 usually slows down gradually as approaching the destination location in order to stop at the destination location. Therefore, in the present embodiment, a travel speed model that slows down near the destination location, that is, the travel speed profile 2 is used.

Using the travel speed profile 2 enables to delay an arrival expected clock time T2 to arrive at the destination location later than an arrival expected clock time T1 when using the travel speed profile 1. Therefore, using the travel speed profile 2 enables to decrease the positioning frequency and to reduce the power consumption.

The present embodiment is, since the user stops at the destination location for the first time, equivalent to a case when a number of stopping times from a current location to a destination location is one time.

[Hardware Configuration of Mobile Information Terminal 100]

Descriptions are given to the mobile information terminal 100 according to the first embodiment. As the mobile information terminal 100, a mobile information processing device, such as a smartphone, a tablet personal computer (PC), and a digital camera, for example, is assumed.

[Hardware Configuration of Mobile Information Terminal 100]

Figure 2:
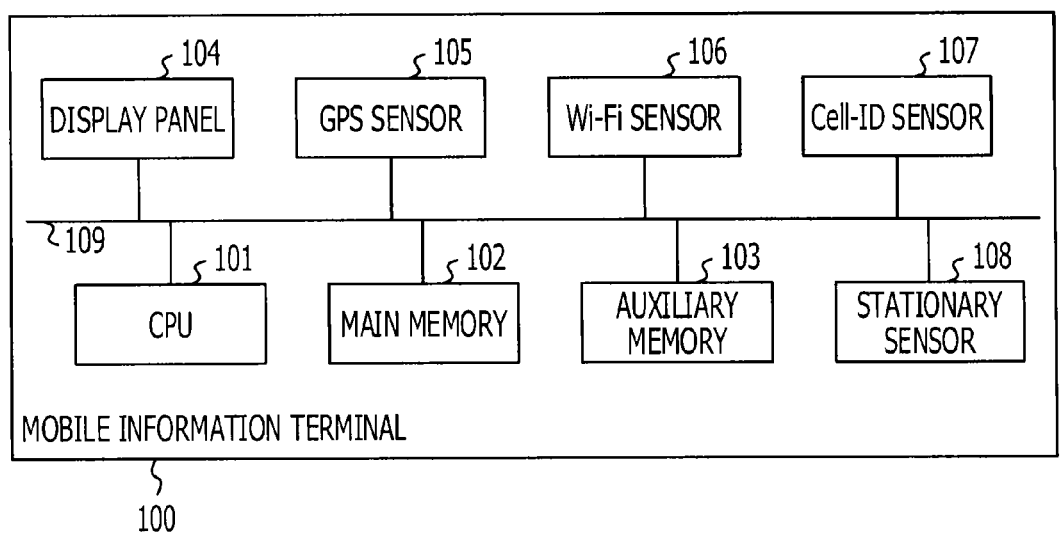
FIG. 2 is a schematic view of a hardware configuration of a mobile information terminal according to the first embodiment.

FIG. 2 is a schematic view of a hardware configuration of the mobile information terminal 100 according to the first embodiment.

As illustrated in FIG. 2, the mobile information terminal 100 according to the present embodiment is provided with a central processing unit (CPU) 101, a main memory 102, an auxiliary memory 103, a display panel 104, a GPS sensor 105, a Wi-Fi® sensor 106, a cell-ID sensor 107, and a stationary sensor 108 as hardware modules. These hardware modules are connected to each other by a bus 109.

The CPU 101 controls the various types of hardware modules of the mobile information terminal 100. Further, the CPU 101 reads out various types of programs stored in the auxiliary memory 103 to the main memory 102 and also executes the various types of programs read out to the main memory 102, thereby achieving various types of functions. Details of the various functions are described later.

The main memory 102 stores the various types of programs to be executed by the CPU 101. Further, the main memory 102 is used as a work area of the CPU 101 and memorizes various types of data desired for process by the CPU 101. As the main memory 102, a random access memory (RAM) or the like, for example, may also be used.

The auxiliary memory 103 stores various types of programs to operate the mobile information terminal 100. As the various types of programs, there are, for example, application programs to be executed by the mobile information terminal 100 as well as an operating system (OS), which is n an execution environment of the application programs, or the like. A control program according to the present embodiment is also stored in the auxiliary memory 103. As the auxiliary memory 103, a non-volatile memory, such as a hard disk and a flash memory, for example, may also be used.

The display panel 104 is provided with a display to display various types of information and a touch screen to obtain a contact position of a fingertip of a user, a pen tip, or the like.

The GPS sensor 105 detects GPS radio signals sent from a plurality of GPS satellites to calculates positional information (latitude and longitude) of the mobile information terminal 100 based on the GPS radio signals. The Wi-Fi sensor 106 detects media access control (MAC) addresses and service set identifiers (SSIDs) sent from a plurality of access points. The cell-ID sensor 107 detects cell-IDs sent from a plurality of base stations of third generation (3G), for example. Both the Wi-Fi sensor 106 and the cell-ID sensor 107 detect a MAC address, an SSID, or cell-ID used for obtaining the positional information of the mobile information terminal 100, so that the Wi-Fi sensor 106 and the cell-ID sensor 107 are regarded as positioning sensors in the present embodiment, similar to the GPS sensor 105.

The stationary sensor 108 is a sensor to sense stationariness of the mobile information terminal 100. As the stationary sensor 108, an acceleration sensor, a gyro sensor, a pneumatic sensor, an illuminance sensor, a microphone, a camera, or the like, for example, may also be used.

[Functional Block of Mobile Information Terminal 100]

Figure 3:
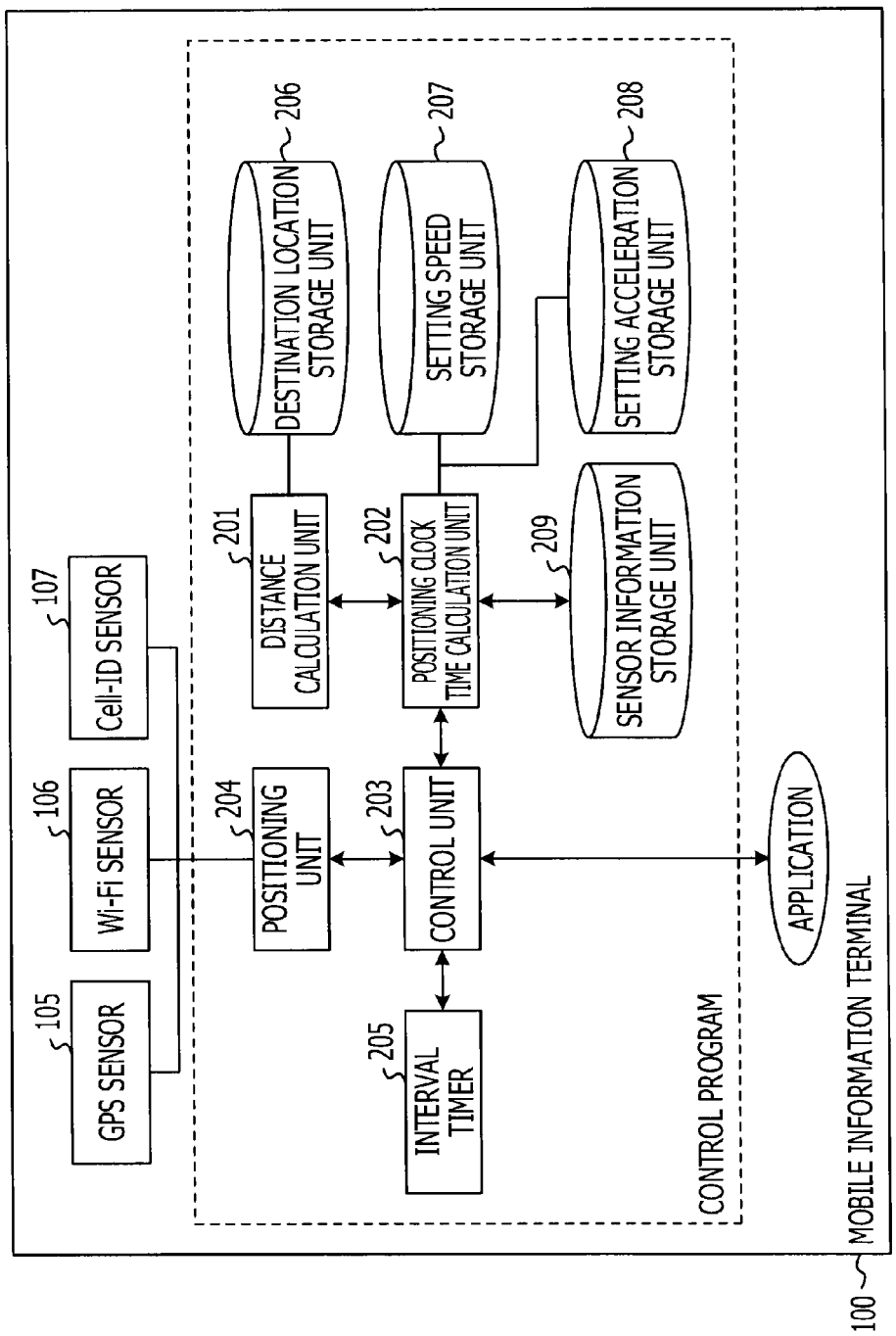
FIG. 3 is a schematic view of a functional block of a mobile information terminal according to the first embodiment.

FIG. 3 is a schematic view of a functional block of the mobile information terminal 100 according to the first embodiment.

As illustrated in FIG. 3, the mobile information terminal 100 according to the present embodiment is provided with a distance calculation unit 201, a positioning clock time calculation unit 202, a control unit 203, a positioning unit 204, an interval timer 205, a destination location storage unit 206, a setting speed storage unit 207, a setting acceleration storage unit 208, and a sensor information storage unit 209.

All of the distance calculation unit 201, the positioning clock time calculation unit 202, the control unit 203, the positioning unit 204, the interval timer 205, the destination location storage unit 206, the setting speed storage unit 207, the setting acceleration storage unit 208, and the sensor information storage unit 209 are achieved by the CPU 101 loading a control program into the main memory 102 and also executing the control program loaded into the main memory 102. The "application" in FIG. 3 is an application program that utilizes the positional information.

The distance calculation unit 201 obtains destination location data and positioning data respectively from the destination location storage unit 206 and the positioning clock time calculation unit 202 to calculate a distance from a current location to a destination location (destination location distance) based on the positional information of the destination location and the positional information of the current location. In a case that a plurality of destination locations are set, the distance calculation unit 201 calculates destination location distances to the respective destination locations. The destination location data contains central coordinates (positional information) of a range circle of the destination location and a radius (range information). In the present embodiment, a distance from the current location to a nearest point on the range circle of the destination location is regarded as the destination location distance. The positioning data contains the positional information (central coordinates) of the current location, error information, and a positioning clock time.

The positioning clock time calculation unit 202 obtains the destination location distance, the setting speed, and the setting acceleration respectively from the distance calculation unit 201, the setting speed storage unit 207, and the setting acceleration storage unit 208 to calculate a positioning clock time for the next time based on the destination location distance, the setting speed, and the setting acceleration. In a case that a plurality of destination location distances are calculated, the positioning clock time calculation unit 202 obtains the minimum value of the destination location distances.

Further, the positioning clock time calculation unit 202 obtains the positioning data of the previous time and the sensor information respectively from the control unit 203 and the sensor information storage unit 209 to specify any of the GPS sensor 105, the Wi-Fi sensor 106, and the cell-ID sensor 107 as a positioning sensor for the next time based on the positioning clock time of the previous time, the positioning clock time for the next time, and the amount of power consumption.

Specifically, the positioning clock time calculation unit 202 calculates the power consumption of the positioning sensor based on the positioning clock time of the previous time, the positioning clock time for the next time, and the amount of power consumption in the positioning sensor to specify a positioning sensor having lowest power consumption as the positioning sensor for the next time. The sensor information contains an error, an amount of power consumption, and positioning time of each positioning sensor.

The control unit 203 sets the positioning clock time from the positioning clock time calculation unit 202 in the interval timer 205 as the positioning clock time for the next time. The control unit 203 takes positioning notification from the interval timer 205 as an opportunity to notify the positioning unit 204 of a positioning instruction. The positioning instruction contains classification information of the positioning sensor specified by the positioning clock time calculation unit 202. Further, in a case that the positioning data from the positioning unit 204 satisfies conditions specified by an application, the control unit 203 notifies the application of information, for example, to be a trigger for location alarm generation. The positioning data contains, for example, positional information (latitude and longitude) and a positioning clock time. Further, the control unit 203 accepts destination location data from an application, that is, positional information and range information of a destination location. The destination location data may also be inputted by, for example, an operation by a user of the mobile information terminal 100.

The positioning unit 204 takes the positioning instruction from the control unit 203 as an opportunity to cause the specified positioning sensor, that is, any of the GPS sensor 105, the Wi-Fi sensor 106, and the cell-ID sensor 107 to perform positioning. Further, the positioning unit 204 obtains the positioning data by the positioning sensor to notify the control unit 203.

The interval timer 205 issues positioning notification to the control unit 203 when the clock time reaches the positioning clock time for the next time.

The destination location storage unit 206 memorizes destination location data inputted by, for example, a user of the mobile information terminal 100. As the destination location data, positional information (latitude and longitude) of the destination location, range information of the destination location, or the like is used, for example. As the range information, a distance from the central coordinates (latitude and longitude) of the destination location, for example, may also be used. The destination location storage unit 206 may also memorize a plurality of destination location data items.

The setting speed storage unit 207 memorizes an estimated maximum travel speed of transportation available for a user of the mobile information terminal 100 as the setting speed. For example, in a case that there are a train and a bicycle as transportation between the specified two points, the setting speed storage unit 207 memorizes the maximum speed of a train, which is higher in speed than a bicycle, as the estimated maximum travel speed. In the present embodiment, the maximum speed of a train is regarded as 120 km/h.

The setting acceleration storage unit 208 memorizes the maximum acceleration of transportation utilized by the user of the mobile information terminal 100 which is estimated during slow down. In the present embodiment, a train is estimated as the transportation to regard the maximum acceleration estimated during slow down as 5/6 m/s². In a case of 5/6 m/s², the speed is slowed down 3 km/h per second.

The sensor information storage unit 209 memorizes a sensor information table T that associates an error, an amount of power consumption, and positioning time with each positioning sensor. Descriptions are given to the sensor information table T.

(Sensor Information Table T)

FIG. 4 is a schematic view of a sensor information table T according to the first embodiment.

As illustrated in FIG. 4, the sensor information table T memorizes an error, an amount of power consumption, and positioning time for each positioning sensor. The error is an error [m] in positional information for each positioning sensor. For example, in a case of the GPS sensor 105, an error of 10 m is allowed in the positioning data. The amount of power consumption is an amount [mAs] of power desired for positioning in one time by each positioning sensor. For example, in a case of the GPS sensor 105, an amount of power of 600 mAs is desired for positioning in one time. The positioning time is time [s (sec)] desired for positioning in one time by each positioning sensor. For example, in a case of the GPS sensor 105, positioning time of 30 s is desired for positioning in one time.

[Positioning Clock Time Determination Process]

Figure 5:
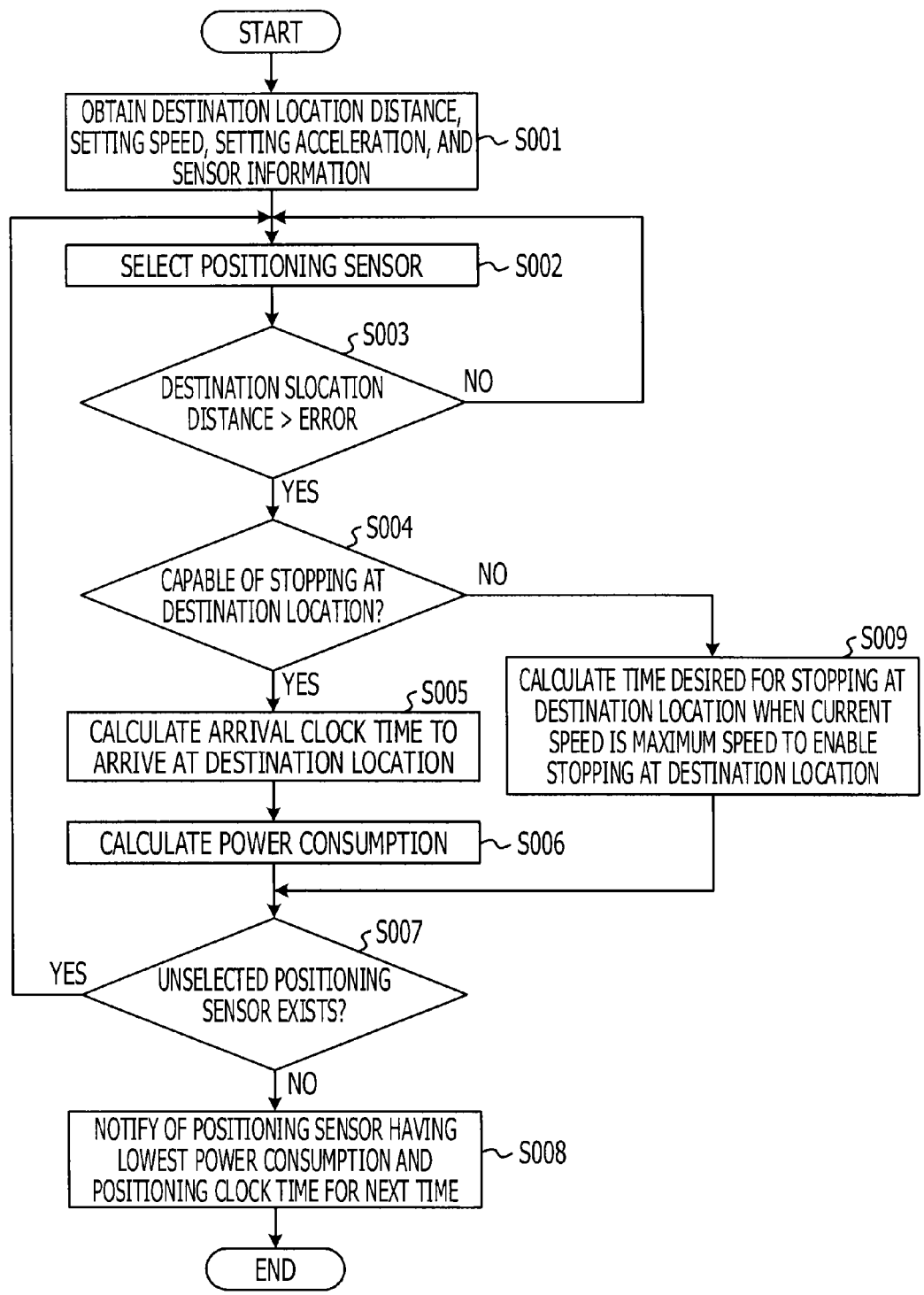
FIG. 5 is a flowchart of positioning clock time determination process according to the first embodiment.
Figure 6A:
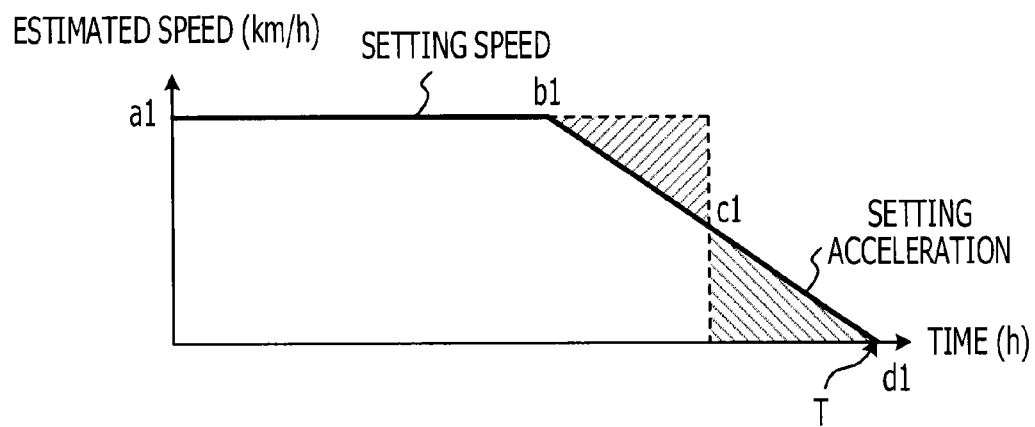
FIGS. 6A and 6B are graphs of travel speed models according to the first embodiment.
Figure 6B:
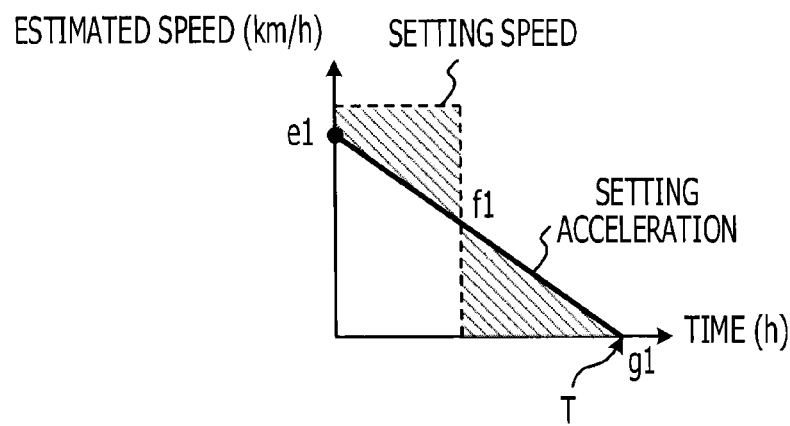

FIG. 5 is a flowchart of positioning clock time determination process according to the first embodiment. FIGS. 6A and 6B are graphs of travel speed models according to the first embodiment. Solid lines ($a_1 b_1 c_1 d_1$, $e_1 f_1 g_1$) in FIGS. 6A and 6B are travel speed profiles according to the present embodiment.

As illustrated in FIG. 5, the positioning clock time calculation unit 202 obtains the destination location distance, the setting speed, the setting acceleration, and the sensor information (an error, power consumption, and running time) respectively from the distance calculation unit 201, the setting speed storage unit 207, the setting acceleration storage unit 208, and the sensor information storage unit 209 (step S001).

Next, the positioning clock time calculation unit 202 selects any one from unselected positioning sensors among the plurality of positioning sensors (step S002). In the present embodiment, the GPS sensor 105, the Wi-Fi sensor 106, and the cell-ID sensor 107 are used as the positioning sensor, so that any one of these positioning sensors is to be selected.

Next, the positioning clock time calculation unit 202 determines whether or not the destination location distance obtained by the distance calculation unit 201 is larger than the error of the currently selected positioning sensor (step S003).

Here, in a case that the destination location distance is not determined as larger than the error of the currently selected positioning sensor (no in step S003), the positioning clock time calculation unit 202 determines as lack of precision of the currently selected positioning sensor and selects any one from the unselected positioning sensors again (step S002).

In contrast, in a case the destination location distance is determined as larger than the error of the currently selected positioning sensor (yes in step S003), the positioning clock time calculation unit 202 determines whether or not the user of the mobile information terminal 100 is capable of stopping at the destination location based on the destination location distance, the setting speed, and the setting acceleration (step S004). That is, the positioning clock time calculation unit 202 determines whether or not the user of the mobile information terminal 100 during the move at the setting speed is capable of stopping before arriving at the destination location by slowing down at the setting acceleration. Specifically, the positioning clock time calculation unit 202 determines whether or not to be capable of stopping at the destination location using a mathematical expression (1) below. In the present embodiment, the destination location distance is expressed as d [m], the setting speed as v [m/s], and the setting acceleration as a [m/s²].

$$\frac{v^2}{2a} \le d \quad (1)$$

Here, in a case of determining that the a user of the mobile information terminal 100 is capable of stopping at the destination location (yes in step S004), that is, in a case of determining that the destination location distance, the setting speed, and the setting acceleration satisfy the mathematical expression (1), the positioning clock time calculation unit 202 calculates an arrival clock time when the user of the mobile information terminal 100 arrives at the destination location as a positioning clock time T for the next time based on the destination location distance, the setting speed, and the setting acceleration using a travel speed model A (travel speed profile: $a_1b_1c_1d_1$) in FIG. 6A (step S005). Specifically, the positioning clock time calculation unit 202 calculates the positioning clock time T for the next time using a mathematical expression (2) below.

$$\text{Positioning clock time } T \text{ for next time} = \frac{d}{v} + \frac{v}{2a} \quad (2)$$

The setting speed is the estimated maximum travel speed, so that the arrival clock time calculated here becomes, in theory, the earliest arrival clock time to be possible to arrive at the destination location. Therefore, even when the arrival clock time is made as the positioning clock time T for the next time, it is substantially possible to securely perform positioning for the next time before arriving at the destination location.

Here, the positioning clock time T for the next time is made as the clock time to complete obtainment of the positional information, while a positioning start clock time Ts for the next time may also be calculated by, for example, subtracting the positioning time of the positioning sensor from the positioning clock time T for the next time.

Next, the positioning clock time calculation unit 202 calculates an amount of power consumption per unit time, that is, power consumption based on the amount of power consumption of the currently selected positioning sensor and the time from the positioning clock time of the previous time to the positioning clock time for the next time (step S006). Specifically, the positioning clock time calculation unit 202 may also calculate the power consumption using a mathematical expression (3) below.

$$\text{Power consumption} = \frac{\text{Amount of power consumption desired for positioning in one time}}{\text{Time from positioning clock time of previous time to positioning clock time of this time}} \quad (3)$$

Next, the positioning clock time calculation unit 202 determines whether or not there is an unselected positioning sensor (step S007).

Here, in a case of determining that there is an unselected positioning sensor (yes in step S007), the positioning clock time calculation unit 202 selects any one from unselected positioning sensors again (step S002).

In contrast, in a case of not determining that there is an unselected positioning sensor (no in step S007), the positioning clock time calculation unit 202 notifies the control unit 203 of a positioning sensor having minimum power consumption and the positioning clock time for the next time (step S008). The control unit 203 sets the positioning clock time for the next time in the interval timer 205 and is to stand by until the positioning clock time for the next time comes. When the positioning clock time for the next time comes, the control unit 203 notifies the positioning unit 204 of a positioning instruction to cause the positioning unit 204 to perform positioning by the specified positioning sensor.

In a case of not determining that the user of the mobile information terminal 100 is capable of stopping at the destination location (no in step S004), the positioning clock time calculation unit 202 views the current speed of the user of the mobile information terminal 100 as the maximum speed of being capable of stopping at the destination location to calculate a stopping clock time when the user is capable of stopping at the destination location as the positioning clock time T for the next time based on the destination location distance and the setting acceleration using a travel speed model B (travel speed profile: $e_1f_1g_1$) in FIG. 6B (step S009). The "$e_1$" point in FIG. 6B is regarded as the maximum speed where the user is capable of stopping at the destination location. Specifically, the positioning clock time calculation unit 202 calculates the positioning clock time T for the next time using a mathematical expression (4) below.

$$\text{Positioning clock time } T \text{ for next time} = \sqrt{\frac{2d}{a}} \quad (4)$$

Since the current speed of the user of the mobile information terminal 100 is viewed as the maximum speed where the user is capable of stopping at the destination location to calculate the stopping clock time where the user is capable of stopping at the destination location, the stopping clock time calculated here becomes, in theory, the earliest arrival clock time to be possible to arrive at the destination location. Therefore, even when the stopping clock time is made as the positioning clock time T for the next time, it is substantially to securely perform positioning for the next time before arriving at the destination location.

Here as well, the positioning start clock time Ts for the next time may also be calculated by subtracting the positioning time of the positioning sensor from the positioning clock time T for the next time.

Next, the positioning clock time calculation unit 202 determines whether or not there is an unselected positioning sensor again (step S007).

Calculation Example

Descriptions are given to a calculation example of the positioning clock time T for the next time.

Here, it is assumed that the setting speed v is 120 km/h, the setting acceleration a is 5/6 m/s², the radius of the range circle of the destination location is 10 m, and the distance from the current location to the central coordinates of the range circle of the destination location is 3000 m.

Firstly, the radius of the range circle of the destination location (=10 m) is subtracted from the distance to the central coordinates of the range circle of the destination location (=3000 m) to calculate the destination location distance d. Specifically calculated, the destination location distance d becomes 2990 m.

Subsequently, in the mathematical expression (1), 2990 m, 120 km/h, and 5/6 m/s² are substituted respectively into the destination location distance d, the setting speed v, and the setting acceleration a.

With that, it is understood that the relationship in the mathematical expression (1) is satisfied, that is, it is understood that the user of the mobile information terminal 100 is capable of stopping at the destination location, so that in the mathematical expression (2), 2990 m, 120 km/h, and 5/6 m/s² are substituted respectively into the destination location distance d, the setting speed v, and the setting acceleration a to calculate the positioning clock time T for the next time. Specifically calculated, the positioning clock time T for the next time becomes 109.7 s.

However, positioning by a positioning sensor takes some time. For example, in a case of the GPS sensor 105, positioning time of 30 s for positioning in one time is desired. Therefore, in order to complete obtainment of the positional information by the positioning clock time T for the next time, the positioning has to be started 30 s before the positioning clock time T for the next time.

Accordingly, the positioning time (=30 s) is subtracted from the positioning clock time T for the next time (=109.7 s) to calculate the positioning start clock time Ts for the next time. Specifically calculated, the positioning start clock time Ts for the next time becomes 79.7 s.

In the mathematical expression (3), 600 mAs and 109.7 s are substituted respectively into the "power consumption desired for positioning in one time" and the "time from the positioning clock time of the previous time to the positioning clock time of this time" to calculate the power consumption. Specifically calculated, the power consumption becomes 54.7 mA.

That is, in a case of using the GPS sensor 105, the positioning clock time T for the next time becomes 109.7 s, the positioning start clock time Ts for the next time becomes 79.7 s, and the power consumption becomes 54.7 mA.

Similarly, in a case of using the Wi-Fi sensor 106, the positioning clock time T for the next time becomes 104 s, the positioning start clock time Ts for the next time becomes 99 s, and the power consumption becomes 0.29 mA.

In the meanwhile, in a case of using the cell-ID sensor 107, the destination location distance d (=3000 m) is less than the error (=5 km) of the cell-ID sensor 107, so that the cell-ID sensor 107 is excluded from candidates for the positioning sensor due to the lack of precision.

Accordingly, the Wi-Fi sensor 106 is set to be the positioning sensor for the next time, and the positioning start clock time Ts for the next time becomes 99 seconds after the positioning clock time from the previous time.

As described above, according to the present embodiment, as a travel speed model to calculate the positioning clock time T for the next time, a travel speed profile in which the estimated value of the travel speed decreases as getting closer to the destination location is used. Therefore, it is possible to delay the positioning clock time T for the next time, that is, to lower the positioning frequency, and as a result, it is possible to reduce the power consumption.

While the maximum travel speed of transportation available for the user of the mobile information terminal 100 is used for the setting speed in the present embodiment, embodiments of the present disclosure are not limited to this. For example, in a case that a plurality of transportation modes are available for move from the current location to the destination location and also the maximum speed of the actually utilized transportation is lower in speed than the maximum speed of another transportation mode, the maximum speed of the other transportation mode may also be used for the setting speed.

Second Embodiment

Descriptions are given below to a second embodiment with reference to FIGS. 7 through 9C. Descriptions are omitted for the configurations and functions equivalent to the first embodiment.

[Functional Block of Mobile Information Terminal 100A]

Figure 7:
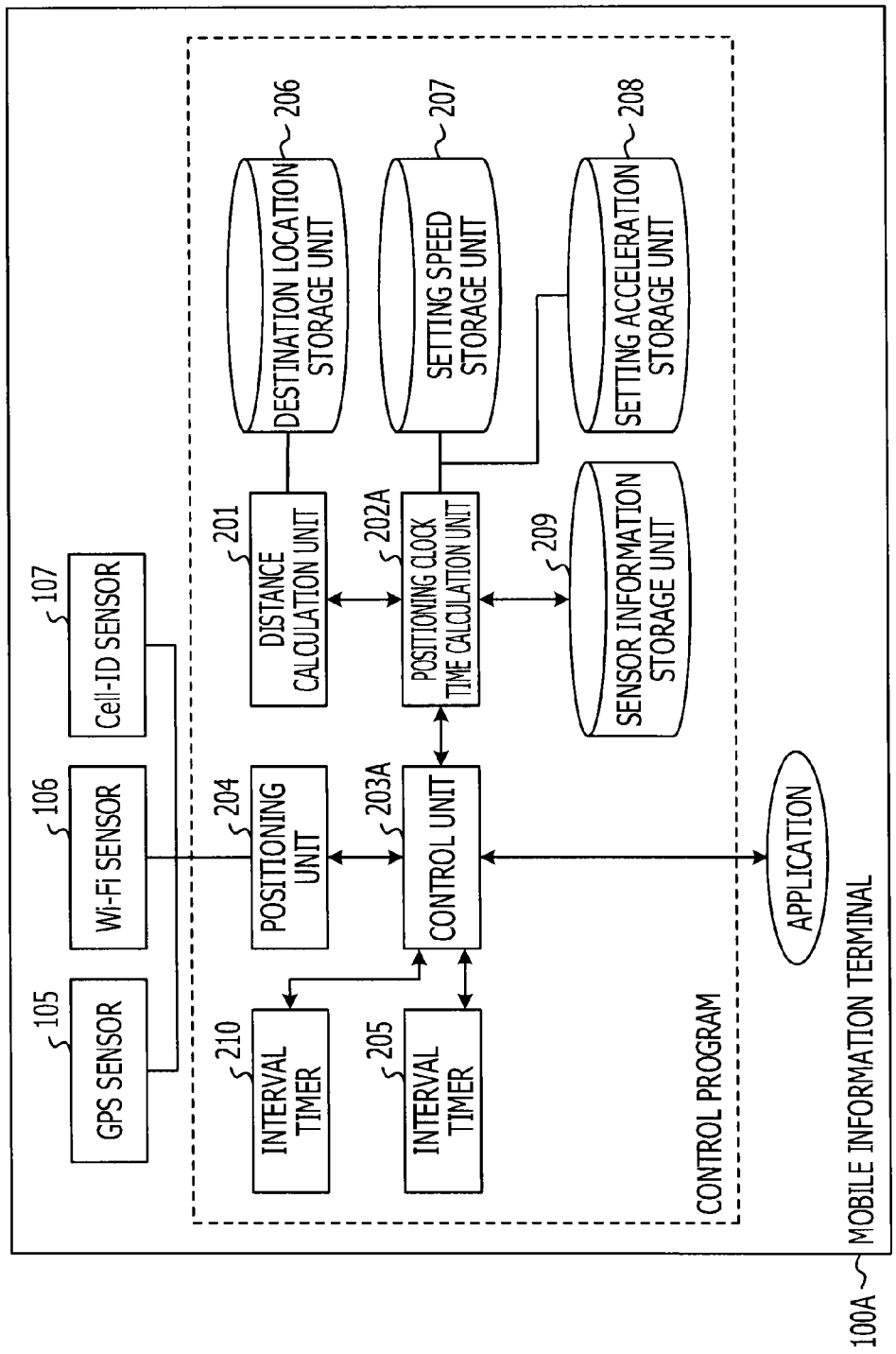
FIG. 7 is a schematic view of a functional block of a mobile information terminal according to a second embodiment.

FIG. 7 is a schematic view of a functional block of a mobile information terminal 100A according to the second embodiment.

As illustrated in FIG. 7, a mobile information terminal 100A according to the present embodiment is provided with a current speed obtaining unit 210 in addition to the mobile information terminal 100 according to the first embodiment. The mobile information terminal 100A according to the present embodiment is also provided with a positioning clock time calculation unit 202A and a control unit 203A instead of the positioning clock time calculation unit 202 and the control unit 203 of the mobile information terminal 100 according to the first embodiment.

All of the current speed obtaining unit 210, the positioning clock time calculation unit 202A, and the control unit 203A are achieved by the CPU 101 loading a control program into the main memory 102 and also executing the control program loaded into the main memory 102.

The current speed obtaining unit 210 calculates a current speed of the mobile information terminal 100A based on detection information from, for example, the stationary sensor 108. Further, the current speed obtaining unit 210 notifies the control unit 203A of the current speed of the mobile information terminal 100A.

The positioning clock time calculation unit 202A obtains the current speed from the control unit 203A to calculate a positioning clock time for the next time based on a destination location distance, a setting speed, setting acceleration, and the current speed.

[Positioning Clock Time Determination Process]

Figure 8:
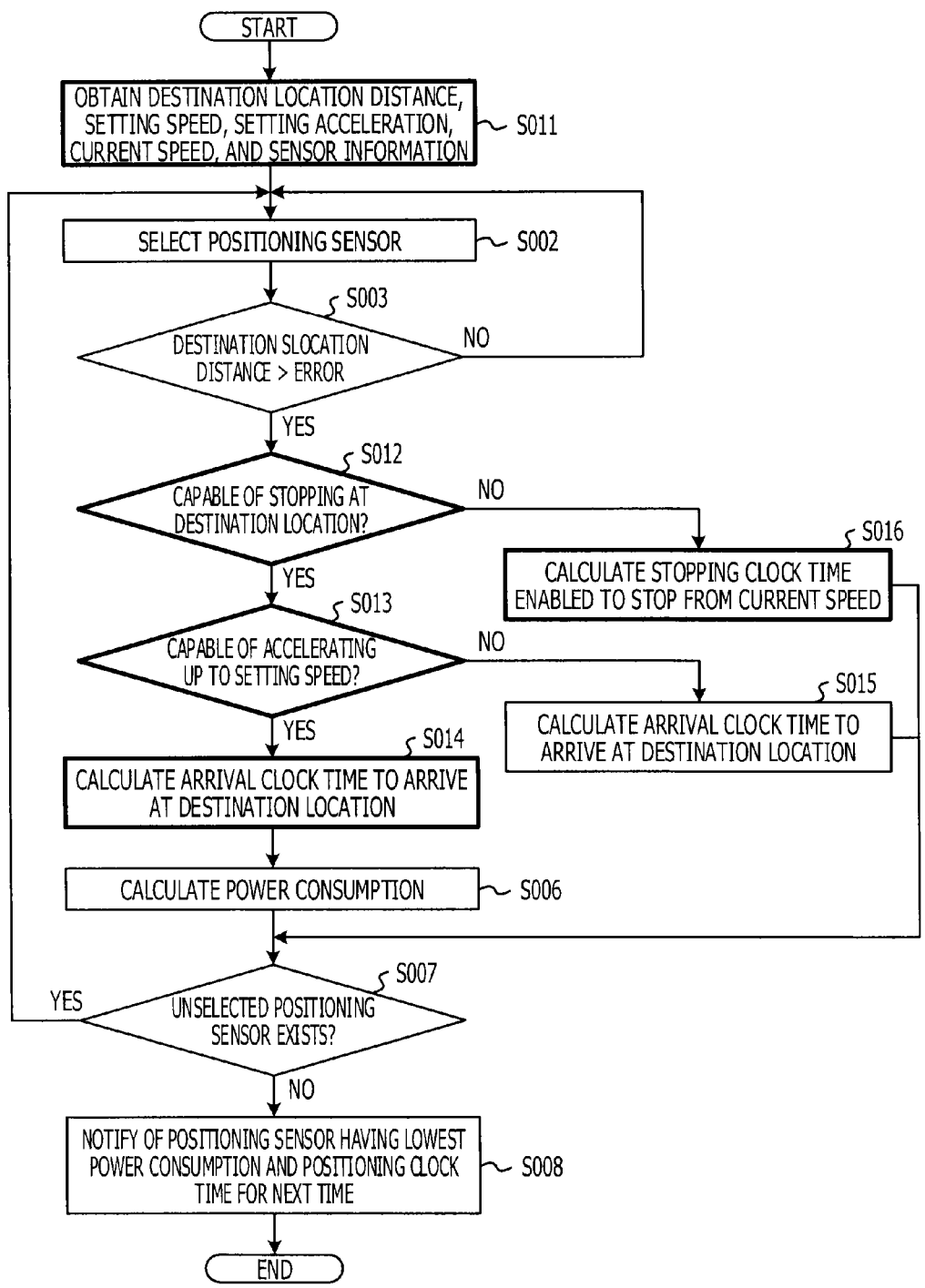
FIG. 8 is a flowchart of positioning clock time determination process according to the second embodiment.
Figure 9A:
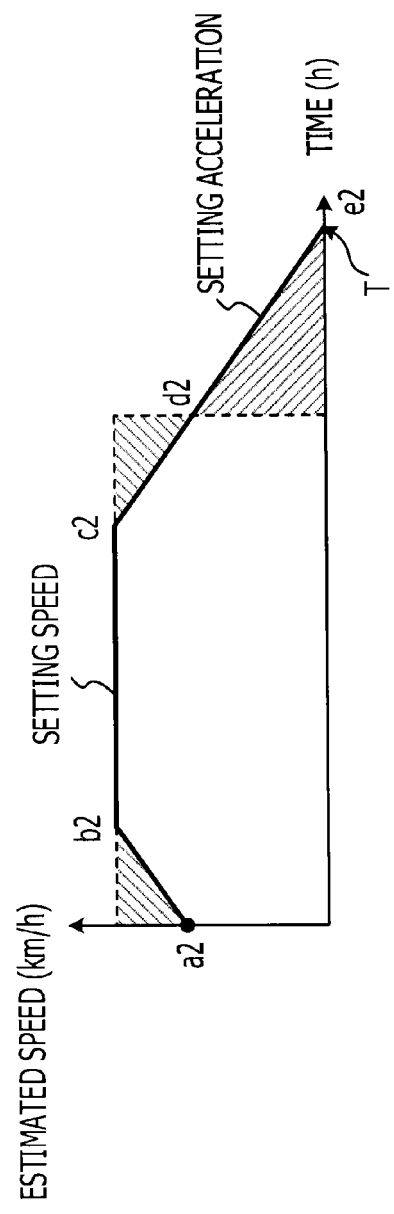
FIGS. 9A, 9B, and 9C are graphs of travel speed models according to the second embodiment.
Figure 9B:
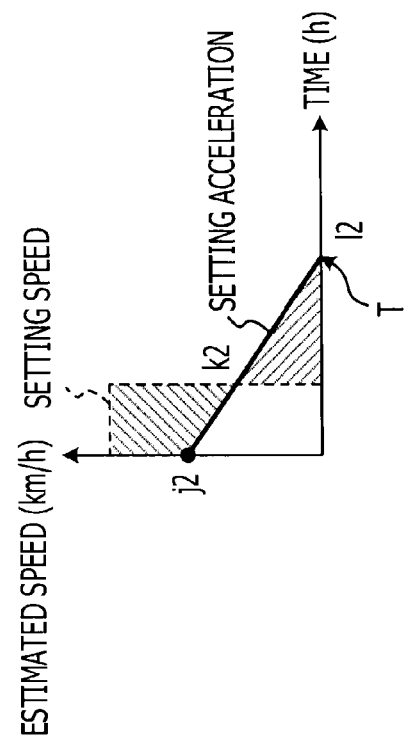
Figure 9C:
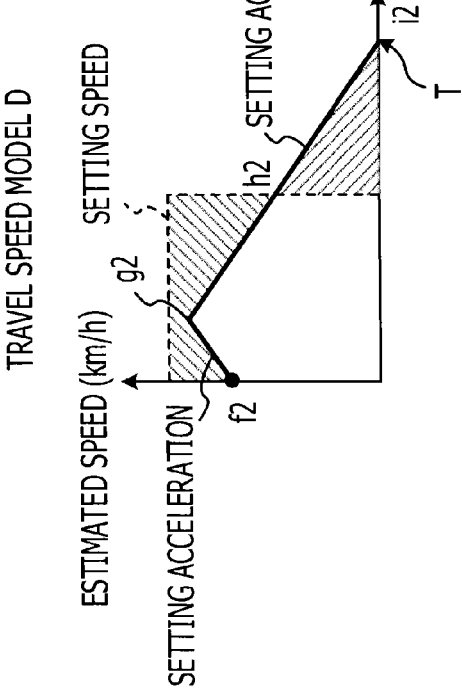

FIG. 8 is a flowchart of positioning clock time determination process according to the second embodiment. FIGS. 9A, 9B, and 9C are graphs of travel speed models according to the second embodiment. Solid lines ($a_2b_2c_2d_2e_2$, $f_2g_2h_2i_2$, $j_2k_2l_2$) in FIGS. 9A, 9B, and 9C are travel speed profiles according to the present embodiment.

As illustrated in FIG. 8, firstly, the positioning clock time calculation unit 202A obtains the destination location distance, the setting speed, the setting acceleration, the current speed, and the sensor information (an error, power consumption, running time) respectively from the distance calculation unit 201, the setting speed storage unit 207, the setting acceleration storage unit 208, the current speed obtaining unit 210, and the sensor information storage unit 209 (step S011).

Further, in a case of determining that the destination location distance is larger than the error of the currently selected positioning sensor (yes in step S003), the positioning clock time calculation unit 202A determines whether or not a user of the mobile information terminal 100A is capable of stopping at the destination location based on the destination location distance, the current speed, and the setting acceleration (step S012). That is, the positioning clock time calculation unit 202A determines whether or not the user of the mobile information terminal 100A is capable of stopping before arriving at the destination location by slowing down at the setting acceleration from the current speed. Specifically, the positioning clock time calculation unit 202A determines whether or not the user is capable of stopping at the destination location using a mathematical expression (5) below. In the present embodiment, the destination location distance is expressed as d [m], the current speed is expressed as $v_0$ [m/s], and the setting acceleration is expressed as a [m/s$^2$].

$$\frac{v_0^2}{2a} \le d \quad (5)$$

Here, in a case of determining that the user of the mobile information terminal 100A is capable of stopping at the destination location (yes in step S012), that is, in a case of determining that the destination location distance, the current speed, and the setting acceleration satisfy the mathematical expression (5), the positioning clock time calculation unit 202A determines whether or not the user of the mobile information terminal 100A is capable of stopping at the destination location even when accelerating up to the setting speed based on the destination location distance, the setting speed, the current speed, and the setting acceleration (step S013). Specifically, the positioning clock time calculation unit 202A determines whether or not the user is capable of stopping at the destination location even when accelerating up to the setting speed using a mathematical expression (6) below.

$$\frac{2v^2 - v_0^2}{2a} \le d \quad (6)$$

Here, in a case of determining that the user of the mobile information terminal 100A is capable of stopping at the destination location even when accelerating up to the setting speed (yes in step S013), that is, in a case of determining that the destination location distance, the setting speed, the current speed, and the setting acceleration satisfy the mathematical expression (6), the positioning clock time calculation unit 202A calculates the arrival clock time to arrive at the destination location as the positioning clock time T for the next time based on the destination location distance, the setting speed, the current speed, and the setting acceleration using a travel speed model C (travel speed profile: $a_2b_2c_2d_2e_2$) in FIG. 9A (step S014). Specifically, the positioning clock time calculation unit 202A calculates the positioning clock time T for the next time using a mathematical expression (7) below.

$$\text{Positioning clock time } T \text{ for next time} = \frac{d}{v} + \frac{v}{2a} + \frac{(v-v_0)^2}{2av} \quad (7)$$

In contrast, in a case of not determining that the user of the mobile information terminal 100A is capable of stopping at the destination location even when accelerating up to the setting speed (no in step S013), the positioning clock time calculation unit 202A calculates the arrival clock time to arrive at the destination location as the positioning clock time T for the next time based on the destination location distance, the current speed, and the setting acceleration using a travel speed model D (travel speed profile: $f_2g_2h_2i_2$) in FIG. 9B (step S015). Specifically, the positioning clock time calculation unit 202A calculates the positioning clock time T for the next time using a mathematical expression (8) below.

$$\text{Positioning clock time } T \text{ for next time} = \frac{2 \times \sqrt{ad + \frac{v_0^2}{2}} - v_0}{a} \quad (8)$$

In a case of not determining that the user of the mobile information terminal 100A is capable of stopping at the destination location (no in step S012), that is, in a case of not determining that the destination location distance, the current speed, and the setting acceleration satisfy the mathematical expression (5), the positioning clock time calculation unit 202A calculates the clock time when the user is capable of stopping from the current speed based on the current speed and the setting acceleration using a travel speed model E (travel speed profile: $j_2k_2l_2$) in FIG. 9C (step S016). Specifically, the positioning clock time calculation unit 202A calculates a clock time that the user is capable of stopping from the current speed using a mathematical expression (9) below.

$$\text{Positioning clock time } T \text{ for next time} = \frac{v_0}{a} \quad (9)$$

In a case of not determining that the user is capable of stopping at the destination location, the positioning clock time T for the next time is to come after passing through the destination location. Accordingly, the control unit 203A may also omit the notification of the positioning clock time for the next time to the interval timer 205.

Calculation Example

Descriptions are given to a calculation example of the positioning clock time T for the next time.

Here, it is assumed that the setting speed v is 120 km/h, the setting acceleration a is 5/6 m/s$^2$, the current speed $v_0$ is 6 km/h, the radius of the range circle of the destination location is 10 m, and the distance from the current location to the central coordinates of the range circle of the destination location is 3000 m.

Firstly, the radius of the range circle of the destination location (=10 m) is subtracted from the distance to the central coordinates of the range circle of the destination location (=3000 m) to calculate the destination location distance d. Specifically calculated, the destination location distance d becomes 2990 m.

Subsequently, in the mathematical expression (5), 2990 m, 5/6 m/s$^2$, and 6 km/h are substituted respectively into the destination location distance d, the setting acceleration a, and the current speed $v_0$, and in the mathematical expression (6), 2990 m, 120 km/h, 5/6 m/s$^2$, and 6 km/h are substituted respectively into the destination location distance d, the setting speed v, the setting acceleration a, and the current speed $v_0$.

With that, it is understood that the relationship of both the mathematical expression (5) and the mathematical expression (6) is satisfied, so that in the mathematical expression (7), 2990 m, 120 km/h, 5/6 m/s$^2$, and 6 km/h are substituted respectively into the destination location distance d, the setting speed v, the setting acceleration a, and the current speed $v_0$ to calculate the positioning clock time T for the next time. Specifically calculated, the positioning clock time T for the next time becomes 127.75 s.

Further, when the positioning sensor is the GPS sensor 105, the positioning time (=30 s) is subtracted from the positioning clock time T for the next time (=127.75 s) to calculate the positioning start clock time Ts for the next time. Specifically calculated, the positioning start clock time Ts for the next time becomes 97.75 s.

In the mathematical expression (3), 600 mAs and 127.75 s are substituted respectively into the "power consumption desired for positioning in one time" and the "time from the positioning clock time of the previous time to the positioning clock time of this time" to calculate the power consumption. Specifically calculated, the power consumption becomes 4.70 mA.

That is, in a case of using the GPS sensor 105, the positioning clock time T for the next time becomes 127.75 s, the positioning start clock time Ts for the next time becomes 97.75 s, and the power consumption becomes 4.7 mA.

Similarly, in a case of using the Wi-Fi sensor 106, the positioning clock time T for the next time becomes 122.05 s, the positioning start clock time Ts for the next time becomes 117.05 s, and the power consumption becomes 0.25 mA.

In the meanwhile, in a case of using the cell-ID sensor 107, the destination location distance d (=3000 m) is less than the error (=5 km) of the cell-ID sensor 107, so that the cell-ID sensor 107 is excluded from candidates for the positioning sensor due to the lack of precision.

Accordingly, the Wi-Fi sensor 106 is set to be the positioning sensor for the next time, and the positioning start clock time Ts for the next time becomes 117 seconds after the positioning clock time from the previous time.

As described above, according to the present embodiment, a travel speed model to calculate the positioning clock time T for the next time is created by considering the current speed of the user of the mobile information terminal 100A. Therefore, it is possible to further delay the positioning clock time T for the next time, that is, to lower the positioning frequency, and as a result, it is possible to reduce the power consumption.

The present embodiment is not limited to this, and in a case of determining that the user of the mobile information terminal 100A remains stationary based on the detection information from the stationary sensor 108, for example, the current speed is set at 0 km/h and the positioning clock time T for the next time may also be calculated again. By correcting the positioning clock time T for the next time every time the user of the mobile information terminal 100A remains stationary, it is possible to further lower the positioning frequency.

Third Embodiment

Descriptions are given below to a third embodiment with reference to FIGS. 10 through 13. Descriptions are omitted for the configurations and functions equivalent to the second embodiment.

While the number of stopping times from the current location to the destination location is one time at the destination location in the first and second embodiments, it is assumed to stop before arriving at the destination location in the present embodiment. It is to be noted that, for simplification of the descriptions, the number of stopping times before arriving at the destination location is one time, that is, the number of stopping times from the current location to the destination location is two times here. It is to be noted that the number of stopping times before arriving at the destination location is not limited to one time.

[Functional Block of Mobile Information Terminal 100B]

Figure 10:
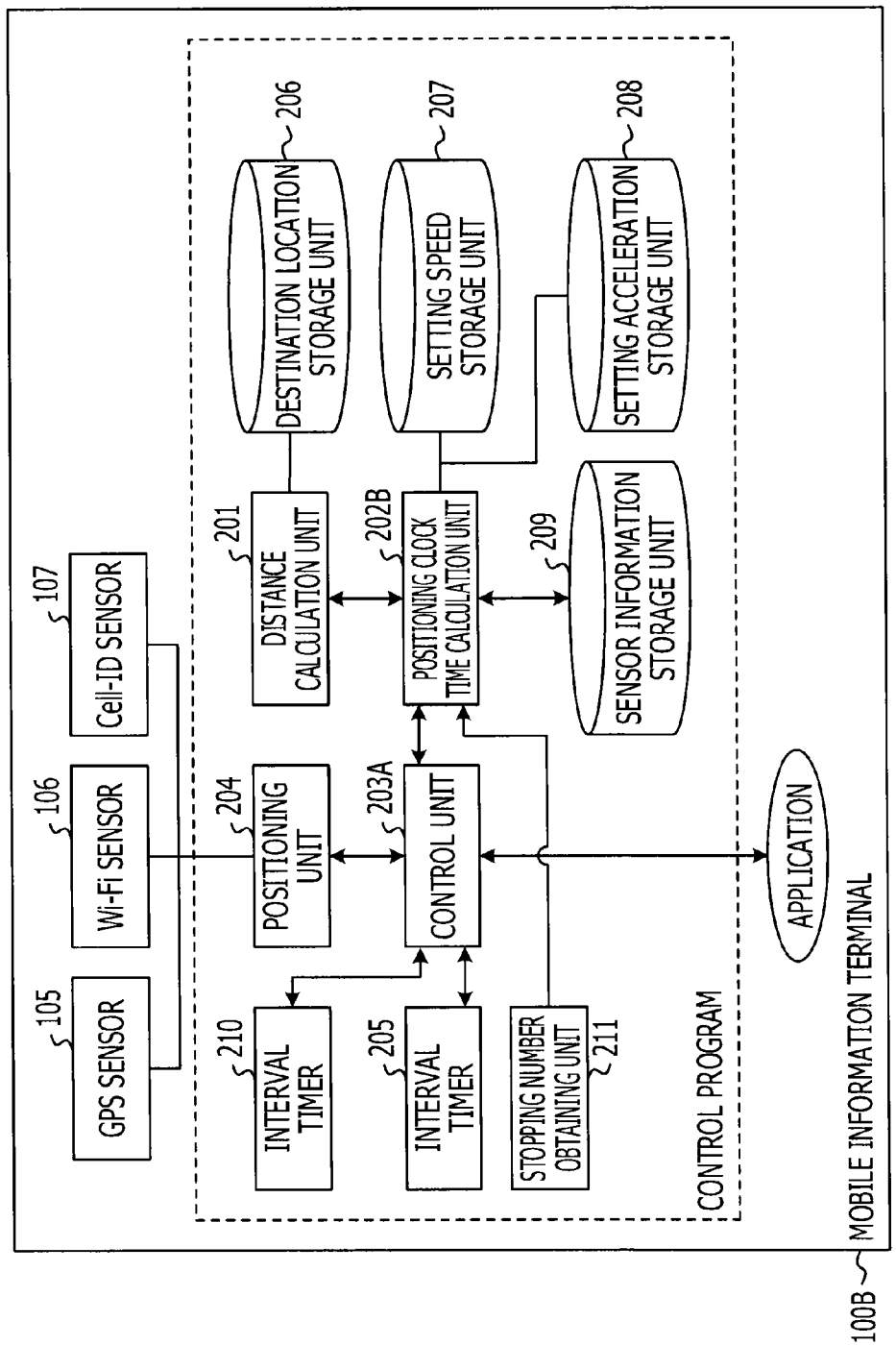
FIG. 10 is a schematic view of a functional block of a mobile information terminal according to a third embodiment.

FIG. 10 is a schematic view of a functional block of a mobile information terminal 100B according to the third embodiment.

As illustrated in FIG. 10, the mobile information terminal 100B according to the present embodiment is provided with a stopping number obtaining unit 211 in addition to the mobile information terminal 100A according to the second embodiment. The mobile information terminal 100B according to the present embodiment is also provided with a positioning clock time calculation unit 202B instead of the positioning clock time calculation unit 202A of the mobile information terminal 100A according to the second embodiment.

Both of the stopping number obtaining unit 211 and the positioning clock time calculation unit 202B are achieved by the CPU 101 loading a control program into the main memory 102 and also executing the control program loaded into the main memory 102.

The stopping number obtaining unit 211 obtains a number of stopping times from the current location to the destination location and stopping clock times based on information of, for example, a time table of a train or the like. As the number of stopping times, a number of stations intended to stop from the current location to the destination location may also be used.

The positioning clock time calculation unit 202B calculates the positioning clock time for the next time based on the destination location distance, the setting speed, the setting acceleration, the current speed, and the number of stopping times.

[Positioning Clock Time Determination Process]

Figure 11:
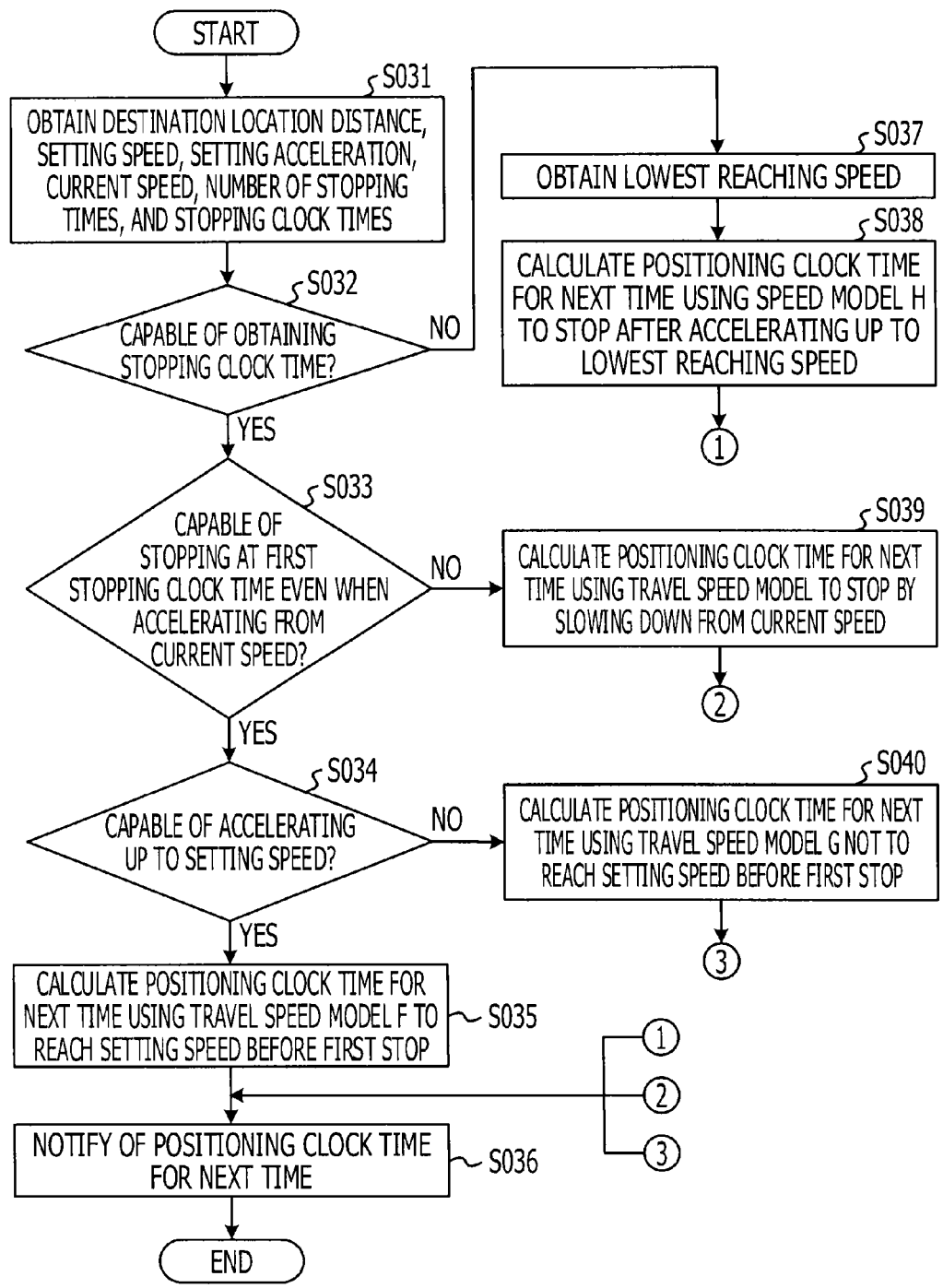
FIG. 11 is a flowchart of positioning clock time determination process according to the third embodiment.
Figure 12A:
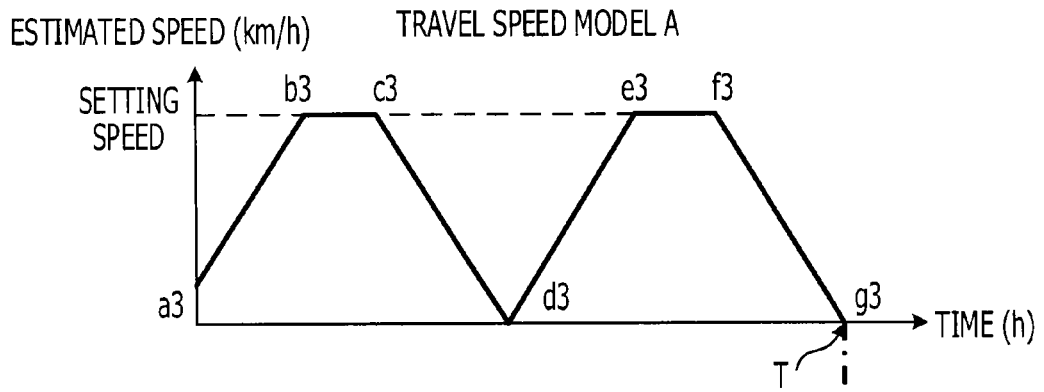
FIGS. 12A, 12B, and 12C are graphs of travel speed models according to the third embodiment.
Figure 12B:
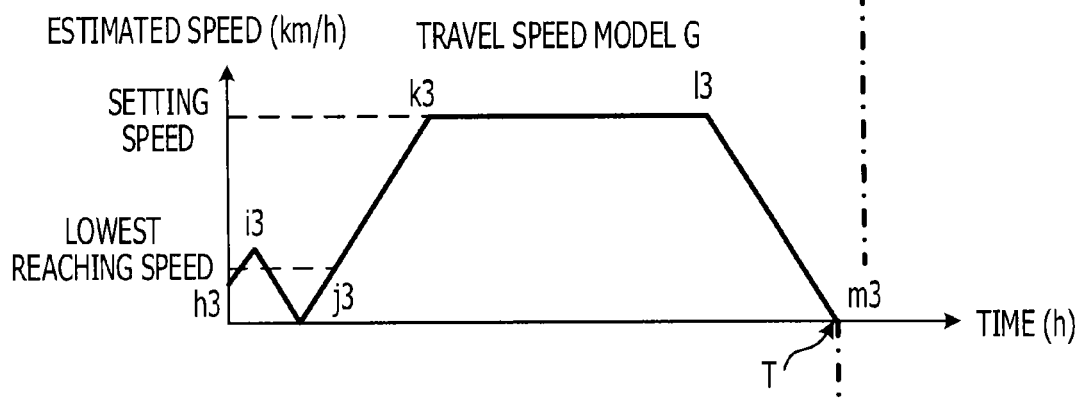
Figure 12C:
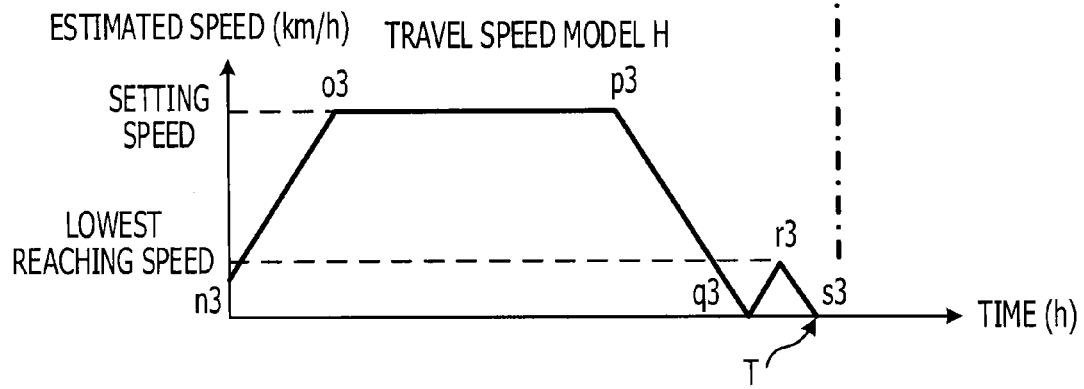

FIG. 11 is a flowchart of positioning clock time determination process according to the third embodiment. FIGS. 12A, 12B, and 12C are graphs of travel speed models according to the third embodiment. Solid lines ($a_3b_3c_3d_3e_3f_3g_3$, $h_3i_3j_3k_3l_3m_3$, $n_3o_3p_3q_3r_3s_3$) in FIGS. 12A, 12B, and 12C are travel speed profiles according to the present embodiment.

As illustrated in FIG. 11, the positioning clock time calculation unit 202B obtains the destination location distance, the setting speed, the setting acceleration, the current speed, and the number of stopping times and the stopping clock times respectively from the distance calculation unit 201, the setting speed storage unit 207, the setting acceleration storage unit 208, the current speed obtaining unit 210, and the stopping number obtaining unit 211 (step S031).

Next, the positioning clock time calculation unit 202B determines whether or not the stopping clock times are successfully obtained (step S032).

Here, in a case of determining that the stopping clock times is successfully obtained (yes in step S032), the positioning clock time calculation unit 202B determines whether or not a user of the mobile information terminal 100B is capable of stopping at a first stopping clock time even when accelerating from the current speed (step S033).

Here, in a case of not determining that the user is capable of stopping at the first stopping clock time even when accelerating from the current speed (no in step S033), the positioning clock time calculation unit 202B calculates the positioning clock time T for the next time using a travel speed model to stop by slowing down from the current speed (step S039).

Next, the positioning clock time calculation unit 202B notifies the control unit 203A of the positioning clock time T for the next time (step S036).

In contrast, in a case of determining that the user is capable of stopping at the first stopping clock time even when accelerating from the current speed (yes in step S033), the positioning clock time calculation unit 202B determines whether or not the user is capable of stopping at the first stopping clock time even when accelerating from the current speed up to the setting speed (step S034).

Here, in a case of not determining that the user is capable of stopping at the first stopping clock time even when accelerating from the current speed up to the setting speed (no in step S034), the positioning clock time calculation unit 202B calculates the positioning clock time T for the next time using a travel speed model G (travel speed profile: $h_3 i_3 j_3 k_3 l_3 m_3$) in FIG. 12B (step S040). The travel speed model G is a model of not reaching the setting speed before the first stop.

Next, the positioning clock time calculation unit 202B notifies the control unit 203A of the positioning clock time T for the next time (step S036).

In contrast, in a case of determining that the user is capable of stopping at the first stopping clock time even when accelerating from the current speed up to the setting speed (yes in step S034), the positioning clock time calculation unit 202B calculates the positioning clock time T for the next time using a travel speed model F (travel speed profile: $a_3 b_3 c_3 d_3 e_3 f_3 g_3$) in FIG. 12A (step S035). The travel speed model F is a model of reaching the setting speed before the first stop.

Next, the positioning clock time calculation unit 202B notifies the control unit 203A of the positioning clock time T for the next time (step S036).

In contrast, in a case of not determining that a stopping clock time is successfully obtained (no in step S032), the positioning clock time calculation unit 202B obtains a lowest reaching speed (step S037). The lowest reaching speed is a lowest estimated value of a maximum speed that the user of the mobile information terminal 100B during stop reaches. The lowest reaching speed may be memorized in, for example, the setting speed storage unit 207.

Next, the positioning clock time calculation unit 202B calculates the positioning clock time T for the next time using a travel speed model H (travel speed profile: $n_3 o_3 p_3 q_3 r_3 s_3$) in FIG. 12C (step S038). The travel speed model H is a model of stopping after accelerating up to the lowest reaching speed. Using the travel speed model H enables to securely perform positioning before passing through the destination location regardless of the actual stopping position.

Next, the positioning clock time calculation unit 202B notifies the control unit 203A of the positioning clock time T for the next time (step S036).

As described above, in the present embodiment, the positioning clock time for the next time is calculated by considering the number of stopping times from the current location to the destination location. Therefore, compared with the first and second embodiments, it is possible to further delay the positioning clock time for the next time.

While the time for each stop, that is, the time from start to end of stop (hereinafter, referred to as stop duration time) is not considered, that is, the stop duration time is regarded as 0 seconds in the present embodiment, stop duration time other than, for example, 0 seconds may also be used. Using the stop duration time other than 0 seconds enables to further delay the positioning clock time for the next time. The stop duration time may be calculated from, for example, the detection information from the stationary sensor 108.

While the number of stopping times is one time in the present embodiment, the number is not limited to this. For example, in a case that the number of stopping times is n times in the travel speed model H, n items of profile of "stop, lowest reaching speed, stop" ($q_3 r_3 s_3$) may be arranged to make a travel speed profile.

[Modification]

The above embodiments are not limited to these. For example, a new travel speed model may also be created by calculating a predicted value of the number of stopping times from the current location to the destination location based on the stopping frequency in the past.

Figure 13:
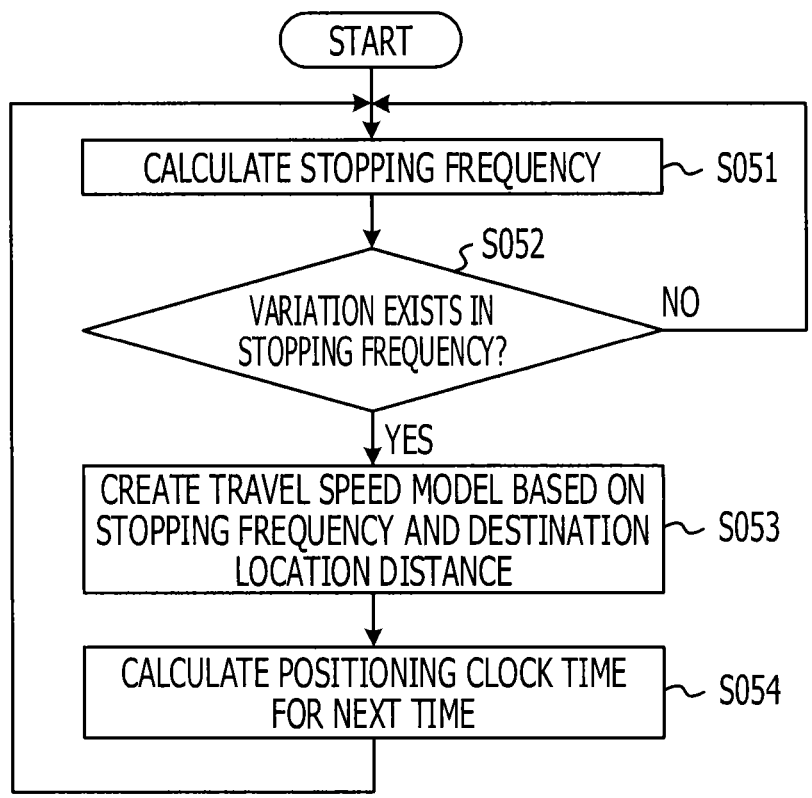
FIG. 13 is a flowchart of process of creating a travel speed model according to a modification of the third embodiment.

FIG. 13 is a flowchart of process of creating a travel speed model according to a modification of the third embodiment.

As illustrated in FIG. 13, the positioning clock time calculation unit 202B calculates the stopping frequency in the past based on the detection information from the stationary sensor 108 (step S051).

Next, the positioning clock time calculation unit 202B determines whether or not there is a variation in the stopping frequency (step S052).

Here, in a case of not determining that there is a variation in the stopping frequency in the past (no in step S052), the positioning clock time calculation unit 202B calculates the stopping frequency in the past again (step S051).

In contrast, in a case of determining that there is a variation in the stopping frequency in the past (yes in step S052), the positioning clock time calculation unit 202B creates a travel speed model based on the stopping frequency after the variation and the destination location distance (step S053).

Next, the positioning clock time calculation unit 202B calculates the positioning clock time T for the next time using the newly created travel speed model (step S054).

As described above, according to the present modification, it is possible to create a travel speed model based on the detection of stopping of the mobile information terminal 100B even in a case that there is no travel speed model. Moreover, even when an event, such as changing trains, for example, occurs, it is possible to create a travel speed model in accordance with a situation after the event.

Descriptions are given below to the effects.

Figure 14:
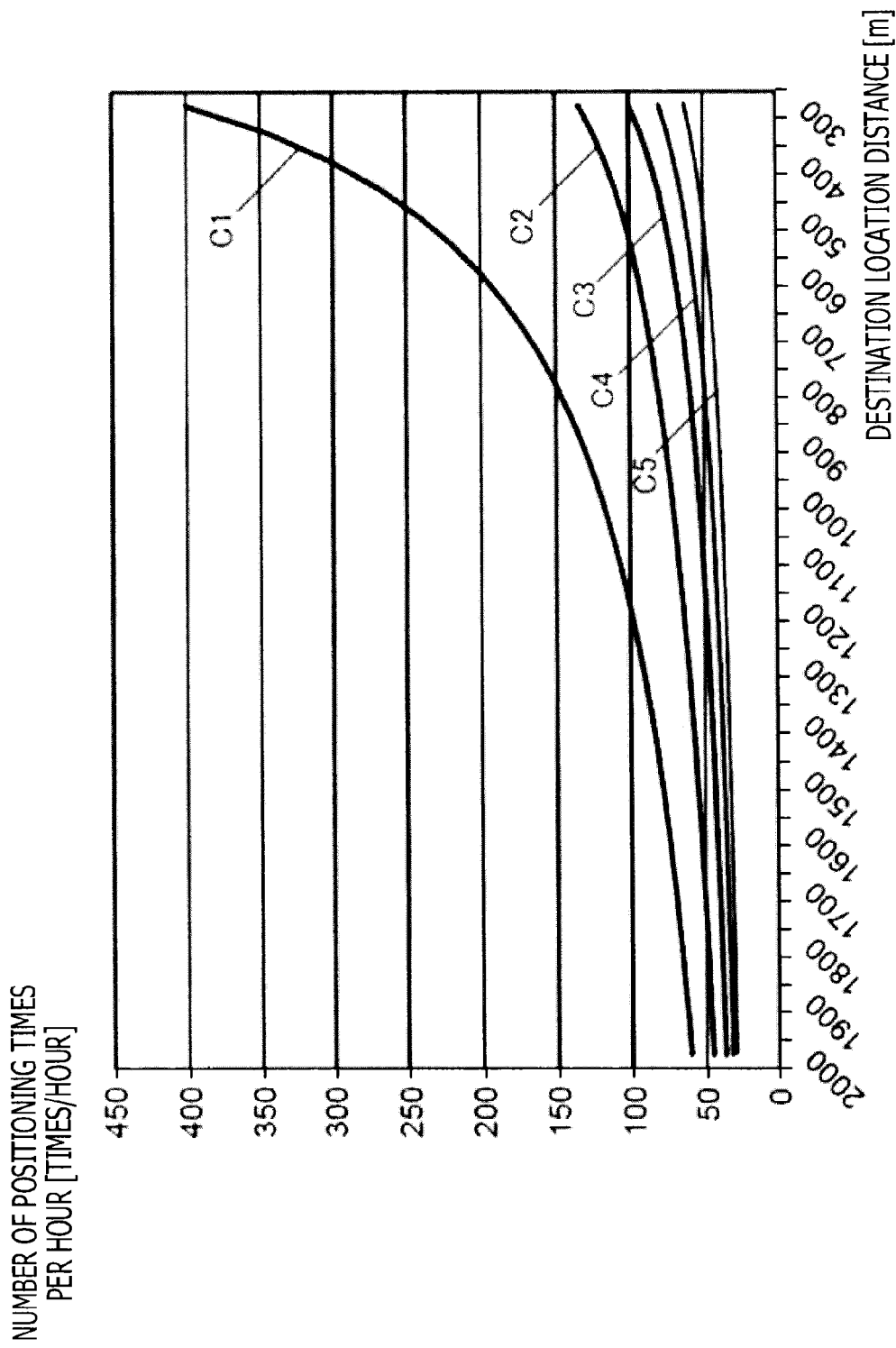
FIG. 14 is a graph of a number of positioning times according to the first through third embodiments.

FIG. 14 is a graph of a number of positioning times according to the first through third embodiments.

In the graph, the horizontal axis represents the destination location distance [m], and the vertical axis represents the number of positioning times per hour [times/hour]. A curve $C_1$ corresponds to a related technique, a curve $C_2$ to the first embodiment, a curve $C_3$ to the second embodiment, a curve $C_4$ to the third embodiment (travel speed model H), and a curve $C_5$ to the third embodiment (travel speed model F). The simulation conditions are the setting speed of 120 km/h, the setting acceleration of 5/6 m/s$^2$, and the current speed of 6 km/h.

As illustrated in FIG. 14, it is understood that the number of positioning times per hour in the first through third embodiments is significantly reduced compared with the related technique as approaching the destination location (as proceeding to the right in the graph).

For example, the number of positioning times per hour according to the related technique is 400 times at the point of the destination location distance of 300 m, whereas the number of positioning times per hour according to the first embodiment is reduced down to 134 times and the number of positioning times per hour according to the second embodiment is down to 100 times.

In a case of using the travel speed model H and the travel speed model F in the third embodiment, the number of positioning times per hour is further reduced compared with the second embodiment.

As described above, simple reduction in number of positioning times may cause an alarm to be too late because the user has already passed through the destination location when performing the positioning, while the positioning clock time for the next time is determined so as to perform the positioning before arriving at the destination location in the first through third embodiments. Therefore, it becomes possible to securely generate an alarm while reducing the power consumption of the mobile information terminal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of controlling a mobile information terminal including a positioning sensor, the method comprising:
    creating a travel speed model indicating a time variation of an estimated value of a travel speed when the mobile information terminal moves from a current location to a destination location, based on a distance to the destination location, information on a speed of a mode of travel to the destination location, and information on stopping before arriving at the destination location; and
    calculating a next measurement time to cause the positioning sensor to perform positioning based on the travel speed model.

2. The method according to claim 1, wherein
the creating uses information on a speed of another mode of travel to the destination location as the information on the speed of the mode of the travel to the destination location when the speed of the mode of travel used for travelling to the destination location is slower than the speed of the another mode of travel.

3. The method according to claim 1, wherein
the information on stopping includes a number of stopping times before arriving at the destination location.

4. The method according to claim 3, wherein
the information on stopping includes time period of the stopping.

5. The method according to claim 1, wherein
the information on the speed of a mode of travel to the destination location is a travel speed, and
the creating creates the travel speed model based on acceleration from the travel speed to the stopping or acceleration from the stopping to the travel speed.

6. The method according to claim 1, wherein
the creating creates the travel speed model every time the stopping is detected.

7. The method according to claim 3, wherein
the creating determines the number of stopping times before the destination location based on a frequency of detecting the stopping.

8. The method according to claim 7, wherein
the creating corrects the number of stopping times before arriving at the destination location based on a variation in the frequency of detecting the stopping.

9. The method according to claim 1, wherein
the travel speed model accelerates as leaving away from the current location with respect to a travel speed detected at the current location.

10. The method according to claim 1, further comprising:
determining whether a user of the mobile information terminal is capable of stopping at the destination location, wherein
the calculating of the next measurement time includes:
    calculating the next measurement time by using the distance to the destination location, a setting speed, and a setting acceleration when it is determined that the user is not capable of stopping at the destination location; and
    calculating the next measurement time by using the distance to the destination location and the setting acceleration when it is not determined that the user is capable of stopping at the destination location.

11. The method according to claim 1, wherein
the next measurement time is a time when obtainment of positional information is completed.

12. The method according to claim 11, further comprising:
calculating a time when measurement of the positional information is started by subtracting a measuring time of the extracted positioning sensor from the calculated next measurement time.

13. A mobile information terminal including a positioning sensor, the mobile information terminal comprising:
    a memory; and
    a processor coupled to the memory and configured to:
        create a travel speed model indicating a time variation of an estimated value of a travel speed when the mobile information terminal moves from a current location to a destination location based on a distance to the destination location, information on a speed of a mode of travel to the destination location, and information on stopping before arriving at the destination location; and
        calculate a next measurement time to cause the positioning sensor to perform positioning based on the travel speed model.

14. A non-transitory computer-readable recording medium storing a program that causes a computer to execute a process, the process comprising:
    creating a travel speed model indicating a time variation of an estimated value of a travel speed when the mobile information terminal moves from a current location to a destination location, based on a distance to the destination location, information on stopping before arriving at the destination location; and
    calculating a next measurement time to cause the positioning sensor to perform positioning based on the travel speed model.

* * * * *